(12) United States Patent
Lee et al.

(10) Patent No.: US 8,625,062 B2
(45) Date of Patent: Jan. 7, 2014

(54) TRANSPARENT DISPLAY DEVICE AND DRIVING METHOD THEREOF HAVING PARTICULAR ACTIVE REFLECTOR

(75) Inventors: Gak Seok Lee, Cheonan-si (KR); Ki Chul Shin, Asan-si (KR); Youn Hak Jeong, Cheonan-si (KR)

(73) Assignee: Samsung Display Co., Ltd., Yongin (KR)

( * ) Notice: Subject to any disclaimer, the term of this patent is extended or adjusted under 35 U.S.C. 154(b) by 128 days.

(21) Appl. No.: 13/408,802

(22) Filed: Feb. 29, 2012

(65) Prior Publication Data

US 2013/0044276 A1 Feb. 21, 2013

(30) Foreign Application Priority Data

Aug. 18, 2011 (KR) .................. 10-2011-0082296

(51) Int. Cl.
*G02F 1/1335* (2006.01)
*G09G 3/36* (2006.01)
*G09G 5/00* (2006.01)

(52) U.S. Cl.
USPC ............. 349/115; 349/113; 349/114; 349/62; 349/65; 345/87; 345/214

(58) Field of Classification Search
USPC ......... 349/115, 113, 114, 62, 65; 345/87, 214
See application file for complete search history.

(56) References Cited

U.S. PATENT DOCUMENTS

| 6,169,708 | B1 * | 1/2001 | Kaneko et al. | 368/84 |
| 6,443,585 | B1 * | 9/2002 | Saccomanno | 362/608 |
| 6,999,147 | B2 * | 2/2006 | Maeda | 349/115 |

FOREIGN PATENT DOCUMENTS

| JP | 2004-333999 | 11/2004 |
| KR | 10-0962109 | 6/2010 |
| KR | 10-2011-0014904 | 2/2011 |

OTHER PUBLICATIONS

U.S. Appl. No. 13/222,981, filed Aug. 31, 2011.

* cited by examiner

*Primary Examiner* — Mike Qi
(74) *Attorney, Agent, or Firm* — H.C. Park & Associates, PLC

(57) ABSTRACT

A transparent display device and a driving method thereof. The transparent display device includes a light guide plate transmitting incident light impinging from its exterior or its back surface and reflecting backlight light impinging from its side surface to its front surface; and an active reflector disposed on the back surface of the light guide plate. The active reflector includes a cholesteric liquid crystal layer transmitting the incident light in a planar phase in a transparent mode.

16 Claims, 11 Drawing Sheets

TRANSPARENT DISPLAY DEVICE AND DRIVING METHOD THEREOF HAVING PARTICULAR ACTIVE REFLECTOR

CROSS-REFERENCE TO RELATED APPLICATION

This application claims priority from and the benefit of Korean Patent Application No. 10-2011-0082296, filed on Aug. 18, 2011, which is hereby incorporated by reference for all purposes as if fully set forth herein.

BACKGROUND

1. Field

Exemplary embodiments of the present invention relate to a transparent display device using a bistable mode of a cholesteric liquid crystal as a drive mode of a reflector, and a driving method of the transparent display device.

2. Discussion of the Background

Flat panel display technology started with the development of liquid crystal display (LCD). With the marvelous advances in technology, flat panel display technology has been applied to most display fields ranging from small-sized mobile devices to notebook computers, monitors, televisions (TVs), and other large-sized display devices. In recent years, transparent display devices are increasingly becoming attractive because they can display information and background at the same time.

A transparent display device includes a high-transmittance screen to make a back surface of the screen visible. Generally, a transparent display device includes a backlight unit, a light guide plate, a liquid crystal panel, and a color filter. Technologies for transparent display devices are disclosed in Korean Patent Registration No. 10-0962109 entitled "REFLECTIVE PLATE, BACKLIGHT UNIT AND LIQUID CRYSTAL DISPLAY INCLUDING THE SAME", Korean Patent Public No. 10-2011-0014904 entitled "TRANSPARENT DISPLAY DEVICE", and Japanese Patent Publication No. 2004-333999 entitled "REFLECTION-TYPE LIQUID CRYSTAL DISPLAY".

The transparent display devices disclosed in the above t documents require relatively high power consumption. On the other hand, low reflectivity in a reflective mode of a transparent display device makes it difficult to implement high resolution. Accordingly, there is a demand for a transparent display technology having high power efficiency in a transparent mode and providing high reflectivity in a reflective mode.

SUMMARY OF THE INVENTION

Exemplary embodiments of the present invention provide a transparent display device and a driving method thereof.

Additional features of the invention will be set forth in the description which follows, and in part will be apparent from the description, or may be learned by practice of the invention.

An exemplary embodiment of the present invention discloses a transparent display device which may include a light guide plate transmitting incident light impinging from its exterior or its back surface and reflecting backlight light impinging from its side surface to its front surface; and an active reflector disposed on the back surface of the light guide plate and including a cholesteric liquid crystal layer transmitting the incident light in a planar phase in a transparent mode.

An exemplary embodiment of the present invention also discloses a driving method of a transparent display device using a cholesteric liquid crystal layer as an active reflector which may include detecting a display mode; and providing, to the active reflector, a phase change pulse for changing a phase of the cholesteric liquid crystal layer to any one of a focal conic phase and a planar phase according to the display mode. The cholesteric liquid crystal layer may operate as a transparent mode in the planar mode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
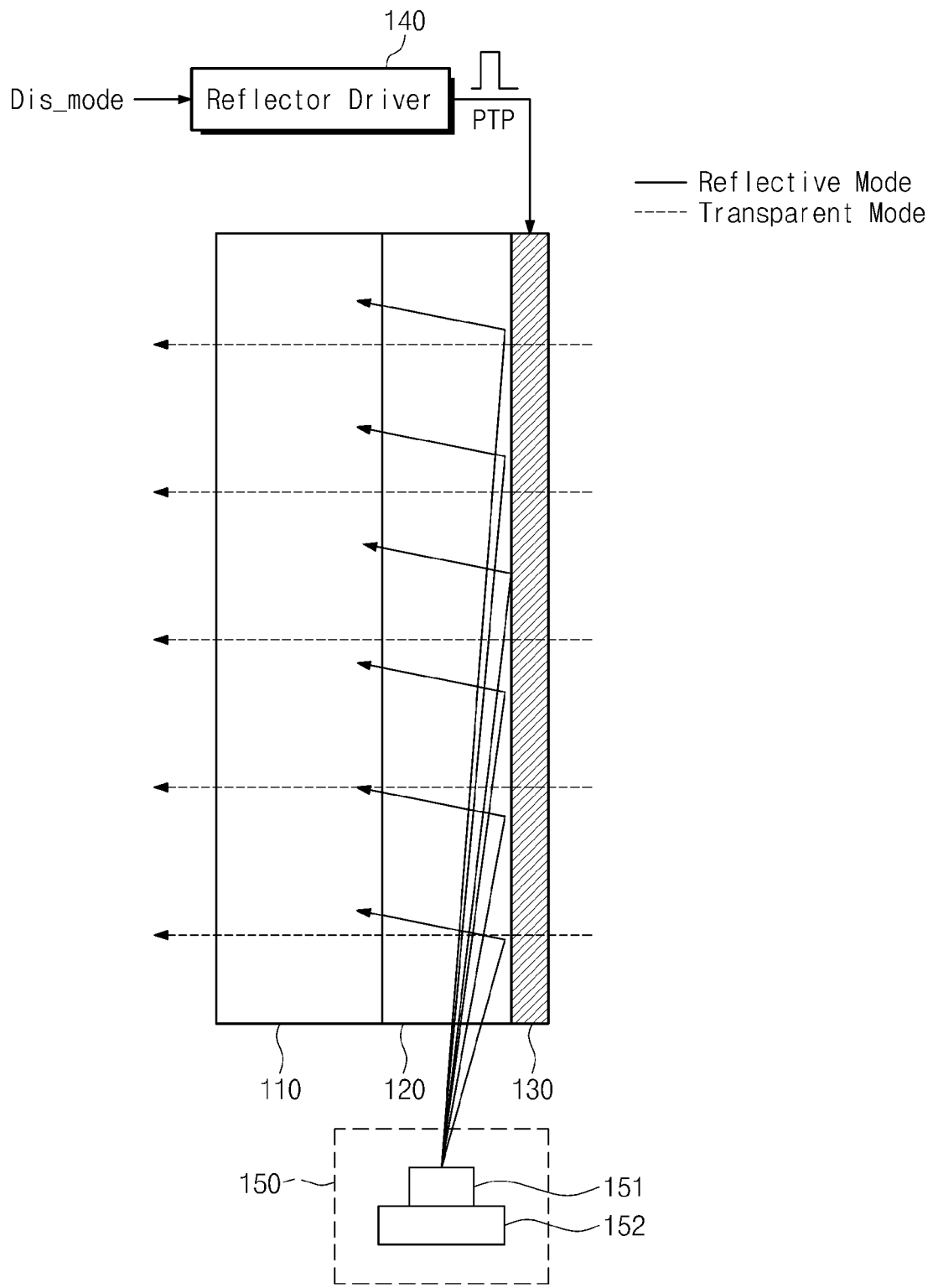
FIG. 1 is a side view of a transparent display device according to an exemplary embodiment of the present invention.

The inventive concept will now be described more fully hereinafter with reference to the accompanying drawings, in which preferred embodiments of the inventive concept are shown. However, the inventive concept may be embodied in many different forms and should not be construed as limited to the embodiments set forth herein. Rather, these embodiments are provided so that this disclosure will be thorough and complete, and will fully convey the scope of the inventive concept to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ)

FIG. 1 is a side view of a transparent display device 100 according to an exemplary embodiment of the present invention. As illustrated, the transparent display device 100 includes a liquid crystal display (LCD) panel 110, a light guide plate (LGP) 120, an active reflector 130, a reflector driver 140, and a backlight light source 150.

The LCD panel 110 may include, for example, a thin film transistor LCD (TFT-LCD). Although not shown, the LCD panel 110 may include a first substrate including a thin film transistor (not shown) and a pixel electrode electrically connected to the thin film transistor, black matrixes arranged at regular intervals to block light impinging from a light source, and a color filter pattern disposed between the black matrixes. In addition, the LCD panel 110 may include a second substrate including an overcoat film disposed on the color filter pattern. A liquid crystal layer inserted between the first substrate and the second substrate may be included in the LCD panel 110. However, the LCD panel 110 may adapt at least one of various display devices which are configurable with a transparent display.

The light guide plate 120 scatters incident light impinging from the backlight light source 150 in a reflective mode. Thus, a uniform surface light source is shown when viewed in front of the transparent display device 100. Although not shown, a plurality of patterns (e.g., concave patterns) may be formed on a back surface of the light guide plate 120. The patterns scatter the incident light from the light source 150 to generate a uniform surface light source. However, the light guide plate 120 transmits lights impinging from a back surface of the transparent display device 100. In a transparent mode, an image may be displayed by transmitted light impinging from the back surface of the light guide plate 120 or ambient light.

The active reflector 130 operates in a transparent mode or a reflective mode according to a display mode. The active reflector 130 includes at least two transparent electrodes and a cholesteric liquid crystal (CLC) layer disposed between the transparent electrodes. The cholesteric liquid crystal layer is set to have transmission and reflection characteristics according to an exemplary embodiment of the present invention. That is, the cholesteric liquid crystal layer operates in a transparent mode in a planar phase and in a reflective mode in a focal conic phase through adjustment of pitches of liquid crystal pixels. The planar phase and the focal conic phase correspond to a bistable mode of a cholesteric liquid crystal. Therefore, if a pulse is applied at least once without continuing to apply a voltage to transparent electrodes, the cholesteric liquid crystal layer shifts to a phase corresponding to the bistable mode. A phase of the cholesteric liquid crystal layer, which corresponds to the bistable mode formed once, is continued even under the condition that an additional voltage is not applied. These characteristic of the cholesteric liquid crystal will be described in detail later with reference to accompanying drawings.

The phase of the cholesteric liquid crystal layer may shift to any one of a homeotropic phase and focal conic and planar phases that are bistable states. The homeotropic phase is a state in which liquid crystal molecules are aligned in a direction perpendicular to a transparent electrode surface. The homeotropic phase is generated when a strong electric field is applied to the cholesteric liquid crystal layer. The planar phase is a state in which a helical axis of a cholesteric liquid crystal cell is arranged in a direction perpendicular to the transparent electrode surface. The focal conic phase is a state in which helical axes of cholesteric liquid crystal cells are arranged in random directions in relation to the transparent electrode surface.

The reflector driver 140 generates a phase change pulse (PTP) according to a display mode Dis_mode. The reflector driver 140 applies the generated phase change pulse PTP to transparent electrodes of the active reflector 130. When the display mode Dis_mode is a transparent mode, the reflector driver 140 applies the phase change pulse PTP such that the cholesteric liquid crystal of the active reflector 130 is arranged in the planar phase. When the display mode Dis_mode is a reflective mode, the reflector driver 140 applies the phase change pulse PTP such that the cholesteric liquid crystal of the active reflector 130 is arranged in the focal conic phase.

The backlight light source 150 allows light to impinge from a side surface of the light guide plate 120 in a reflective mode. The impinging light is reflected or scattered by the patterns formed on the back surface of the light guide plate 120. The scattered or reflected light may be delivered to the side of the LCD panel 110. Although the backlight light source 150 may comprise one of various light emitting devices, a light emitting diode (LED) is shown in the exemplary embodiment of the present invention. The LED may include an LED element 151 disposed on an LED substrate 152. However, it will be understood that the backlight light source 150 may alternatively be formed using other light sources besides an LED.

According to the transparent display device described thus far, the active reflector 130 includes a cholesteric liquid crystal layer using a planar phase as a transparent mode. In addition, a focal conic phase of the cholesteric liquid crystal layer is used as a reflective mode of the transparent display device. The planar phase and the focal conic phase correspond to a bistable mode of a cholesteric liquid crystal. Thus, transition to the transparent mode or the reflective mode may be done by applying a pulse without continuing to supply a voltage. The bistable mode formed once may be maintained before a separate voltage is applied. Thus, it will be expected that power efficiency will increase in the transparent display device 100 adopting the active reflector 130 according to exemplary embodiments of the present invention. In addition, high reflectivity in a focal conic phase may be provided through adjustment of a cell pitch of the cholesteric liquid crystal. Thus, it is expected that picture quality may be significantly improved in the reflective mode of the transparent display device 100.

Figure 2:
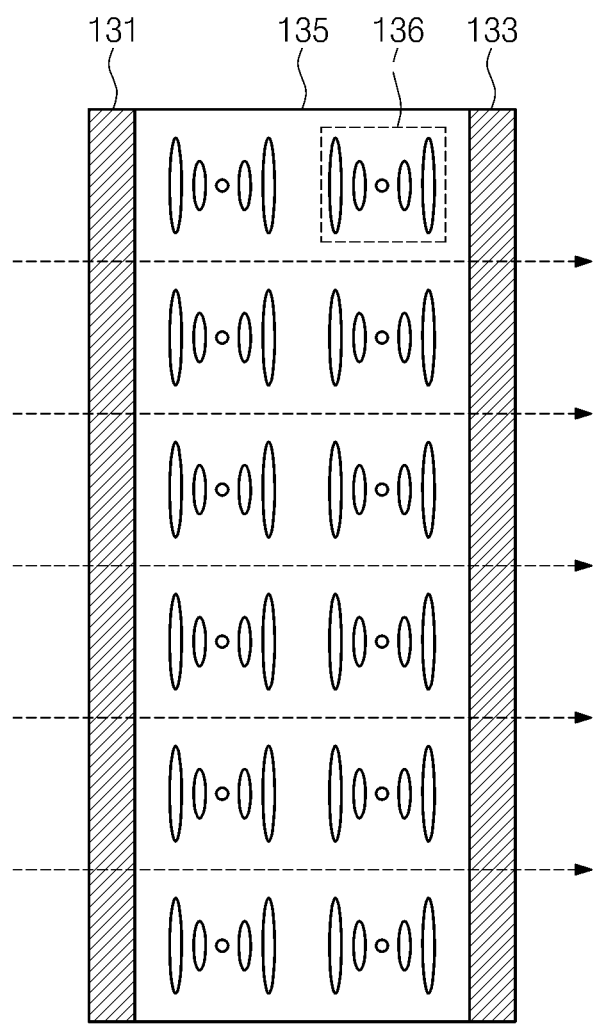
FIG. 2 illustrates a transparent mode of an active reflector according to an exemplary embodiment of the present invention.
Figure 3:
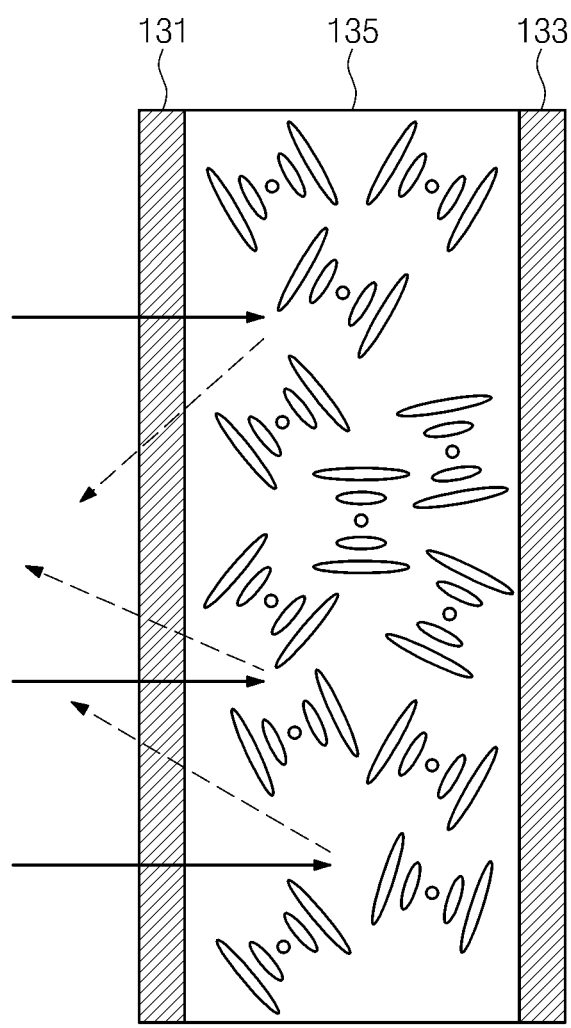
FIG. 3 illustrates a reflective mode of the active reflector according to an exemplary embodiment of the present invention.

FIGS. 2 and 3 are side views illustrating functions of the active reflector 130 shown in FIG. 1. FIG. 2 illustrates the arrangement of liquid crystal cells included in the active reflector 130 in a transparent mode, and FIG. 3 illustrates the arrangement of liquid crystal cells included in the active reflector in a reflective mode. The term 'liquid crystal cell' is defined to indicate the minimum unit of liquid crystal molecules rotating on the same helical axis.

Referring to FIG. 2, the arrangement of liquid crystal cells included in the active reflector 130 in a transparent mode is illustrated. The active reflector 130 includes a cholesteric liquid crystal layer 135 disposed between a first transparent electrode 131 and a second transparent electrode 133. A plurality of liquid crystal cells is included in the cholesteric liquid crystal layer 135. For example, the arrangement of the liquid crystal cell 136 may be altered by phase change pulse PTP applied to the transparent electrodes 131 and 133. That is, a helical axis of the liquid crystal cell 136 is arranged parallel to a direction of an electric field established by the phase change pulse PTP. If all the liquid crystal cells of the cholesteric liquid crystal layer 135 have the above arrangement, the cholesteric liquid crystal layer 135 may transition to a planar phase.

The cholesteric liquid crystal layer transitioning to the planar phase is maintained at the planar phase without applying an additional electric field. Accordingly, the active reflector 130 transitioning to the planar phase may be maintained at a transparent mode by applying a phase change pulse PTP at least once. In the planar phase, the liquid crystal cell 136 is arranged in a direction where the helical axes of liquid crystal molecules are perpendicular to a transparent electrode plate. Parameters of the cholesteric liquid crystal cell 136 according to exemplary embodiments of the present invention will be described in detail later with reference to FIG. 4A and FIG. 4B.

The cholesteric liquid crystal layer 135 according to exemplary embodiments of the present invention may transmit light in a visible region (about 380 nm-780 nm) in the planar phase. A pitch of the liquid crystal cell 136 should be adjusted to provide the transmission characteristic.

Referring to FIG. 3, the arrangement of liquid crystal cells included in the active reflector in a reflective mode is illustrated. As described in FIG. 2, the active reflector 130 includes a cholesteric liquid crystal layer 135 between a first transparent electrode 131 and a second transparent electrode 133. The cholesteric liquid crystal layer 135 disposed between the first and second transparent electrodes 131 and 133 may be maintained at a focal conic phase in a reflective mode. As a phase change pulse PTP is applied to form the focal conic phase, cholesteric liquid crystal cells are arranged in a random distribution, as illustrated. That is, helical axes of the liquid crystal cells may be arranged in a random direction. Accordingly, as the respective helical axes of the liquid crystal cells are randomly arranged, incident lights are scattered irrespective of their wavelengths. Thus, lights impinging from a front surface of the cholesteric liquid crystal layer 135 are scattered in a random direction.

Figure 4A:
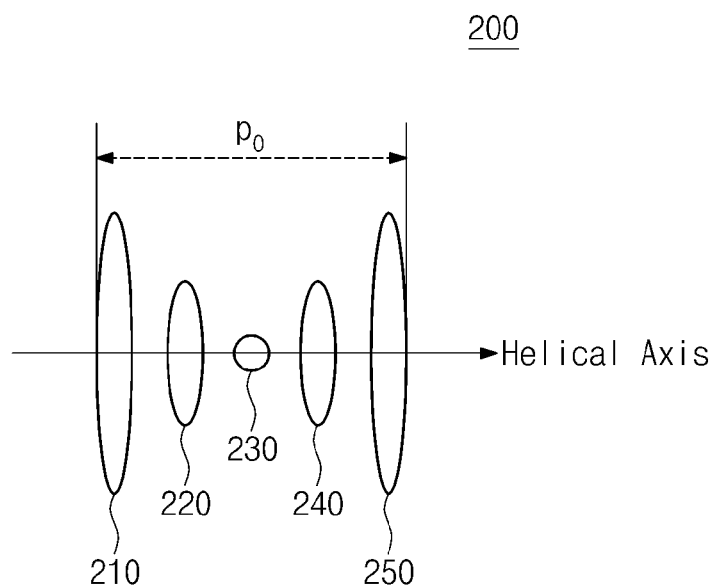
FIG. 4A and FIG. 4B illustrate parameters of a liquid crystal cell according to an exemplary embodiment of the present invention.
Figure 4B:
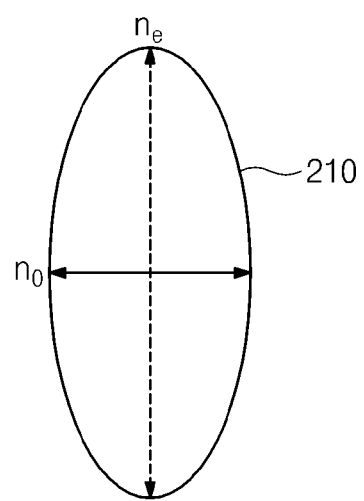

FIGS. 4A and 4B illustrate parameters of a liquid crystal cell according to an embodiment of the present invention. FIG. 4A shows a liquid crystal cell, and FIG. 4B shows one liquid crystal molecule.

Referring to FIG. 4A, a liquid crystal cell 200 is arranged to rotate on a helical axis. That is, a plurality of liquid crystal molecules 210, 220, 230, 240, and 250 included in the liquid crystal cell 200 are arranged to rotate in a helical direction. The liquid crystal molecules 210 and 250 are arranged to have a phase difference of 180 degrees. Transmission/reflection characteristics of a cholesteric liquid crystal panel are determined by a pitch $p_0$ of the liquid crystal cell 200. The pitch $p_0$ of the liquid crystal cell 200 may be substantially adjusted utilizing a mixture of Chiral dopants for inducing a periodical helical structure of liquid crystal molecules. The pitch $p_0$ of the liquid crystal cell 200 may be increased or decreased utilizing the mixture of Chiral dopants. Optical characteristics of a cholesteric liquid crystal may be adjusted by the pitch $p_0$ of the liquid crystal cell 200. That is, reflection and transmission characteristics in a planar phase of a cholesteric liquid crystal or reflection characteristics in a focal conic phase of the cholesteric liquid crystal may be altered according to the adjustment of the pitch $p_0$ of the liquid crystal cell 200.

FIG. 4B shows a liquid crystal molecule 210 in brief. The liquid crystal molecule 210 has an elliptical structure. A refractive index of the liquid crystal molecule 210 may be expressed by a major axis refractive index $n_e$ and a minor axis refractive index $n_0$ of an ellipse. In general, a refractive index of a cholesteric liquid crystal uses an average refractive index. That is, an average of a major axis refractive index and a minor axis refractive index is used as a refractive index of a liquid crystal molecule.

According to the structure of the liquid crystal cell described above with reference to FIGS. 4A and 4B, a selectively reflected wavelength in a planar phase may be expressed by equation 1 below.

$$\lambda_0 = \frac{1}{2} p_0 (n_e + n_o) \qquad \text{[Equation 1]}$$

wherein $\lambda_0$ represents a selectively reflected wavelength, and $p_0$ represents a pitch of a liquid crystal cell.

That is, a reflection wavelength of a cholesteric liquid crystal in a planar phase may be expressed by multiplication of a pitch $p_0$ of a liquid crystal cell by an average refractive index $(n_e+n_o)/2$ of a liquid crystal molecule. As described above, the pitch $p_0$ of a liquid crystal cell may be adjusted by using Chiral dopant. Thus, it will be understood that the cholesteric liquid crystal is used as a transparent mode in the planar phase through the adjustment of the pitch $p_0$ of the liquid crystal cell.

Figure 5:
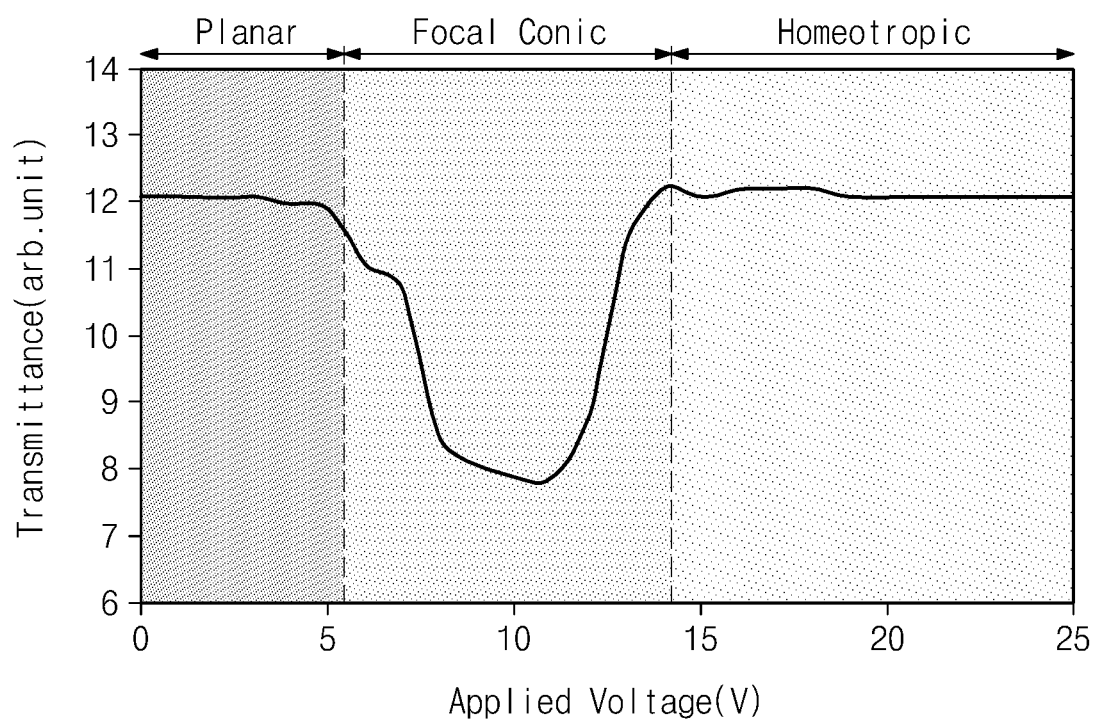
FIG. 5 is a graphic diagram illustrating transmission characteristics for an applied voltage of a cholesteric liquid crystal according to an exemplary embodiment of the present invention.

FIG. 5 is a graphic diagram illustrating transmission characteristics for an applied voltage of a cholesteric liquid crystal according to an exemplary embodiment of the present invention. Referring to FIG. 5, transmittance of a long-pitch cholesteric liquid crystal for a voltage applied to a transparent electrode is shown. The term 'long pitch' means that a pitch $p_0$ of a cholesteric liquid crystal cell is greater than 500 nm.

When the voltage applied to the transparent electrode is less than about 5 volt, the cholesteric liquid crystal is maintained at the planar phase. The transmittance of the cholesteric liquid crystal in the planar phase may be maintained at a size of about 12 arbitrary units.

On the other hand, when a voltage applied to the transparent electrode is within the range from about 5 volts to about 14 volts, the cholesteric liquid crystal transitions to a focal conic phase. The transmittance characteristic of the cholesteric liquid crystal is transformed into a U shape as the voltage increases within a range from about 5 volts to about 14 volts. When a voltage of about 10 volts is applied to the transparent electrode, the transmittance of the cholesteric liquid crystal decreases to about 8 arbitrary units.

When a voltage of about 14 volts or higher is applied to the transparent electrode, the cholesteric liquid crystal transitions from a focal conic phase to a homeotropic phase. The transmittance of the cholesteric liquid crystal returns to about 12 arbitrary units in the homeotropic phase.

The transmission characteristics of a long-pitch cholesteric liquid crystal according to the present invention have been described above. According to the long-pitch cholesteric liquid crystal, there is substantially no difference between the transmittance in the planar phase and the transmittance in the homeotropic phase. A high voltage should be continuously applied to the transparent electrode to maintain the homeotropic phase. However, the planar phase and the focal conic phase are continuously maintained even when the applied voltage is cut off after a pulse is provided only once, i.e., a bistable state. Thus, the planar phase of the cholesteric liquid crystal may be used as a transparent mode of an active reflector (130 in FIG. 1) and the focal conic phase of the cholesteric liquid crystal may be used as a reflective mode thereof. Since continuously applying a voltage to the transparent electrode is not required in the transparent mode or the reflective mode, it is expected that power consumption of the transparent display device adopting the active reflector 130 will be reduced, according to exemplary embodiments of the present invention.

Figure 6:
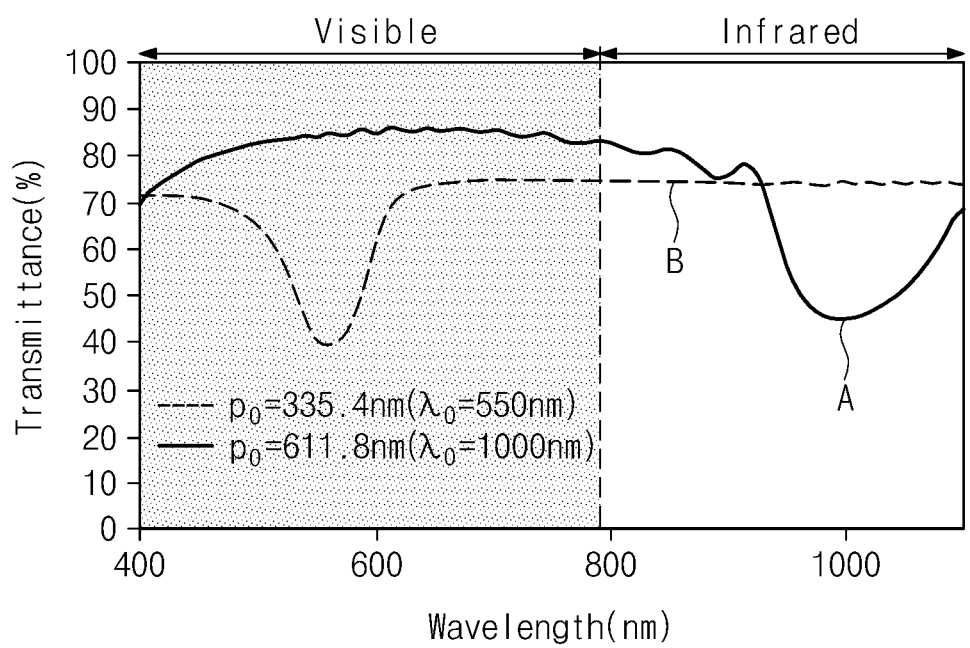
FIG. 6 is a graphic diagram illustrating transmission characteristics for a wavelength of an incident light of the cholesteric liquid crystal according to an exemplary embodiment of the present invention.

FIG. 6 is a graphic diagram illustrating other transmission characteristics for a wavelength of an incident light of the cholesteric liquid crystal according to an exemplary embodiment of the present invention. In the graph of FIG. 6, a curve "A" stands for a transmission characteristic in a planar phase of a long-pitch cholesteric liquid crystal and a curve "B" stands for a transmission characteristic of a cholesteric liquid crystal of a general cell pitch. These transmission characteristics will now be described below.

The transmission characteristic for incident light of a long-pitch cholesteric liquid crystal may be represented by the curve "A". It is assumed that a long-pitch cholesteric liquid crystal according to an exemplary embodiment of the present invention has a cell pitch $p_0$ of about 611.8 nm. A selectively reflected wavelength $\lambda_0$ of the long-pitch cholesteric liquid crystal in the planar phase becomes a wavelength band of about 1000 nm according to the foregoing equation 1. As illustrated, the transmittance of the long-pitch cholesteric liquid crystal in a visible region is maintained at a high transmittance of 70 percent or greater. The transmittance gradually decreases in an infrared region and becomes a minimum with respect to incident light having a wavelength of about 1000 nm. Thus, it will be understood that the planar phase of the cholesteric liquid crystal having a cell pitch $p_0$ of about 611.8 nm may be sufficiently used as a transparent mode of an active reflector.

On the other hand, the transmission characteristic of a cholesteric liquid crystal using the planar phase as a reflective mode is represented by the curve "B". In this case, the cholesteric liquid crystal cell has a cell pitch of about 334 nm. A selectively reflected wavelength $\lambda_0$ of the cholesteric liquid crystal in the planar phase becomes a wavelength band of about 550 nm according to the foregoing equation 1. As illustrated by the curve "B", the transmittance of the cholesteric liquid crystal in the visible region is remarkably lower than that represented by the curve "A". The minimum transmittance of about 40 percent is exhibited with respect to incident light having a wavelength of about 550 nm. Thus, it will be understood that the planar phase of the cholesteric liquid crystal having a cell pitch p0 of about 335.4 nm has a relatively poor transmittance characteristic with respect to visible light.

It has been described with reference to the figures above that a planar phase of a long-pitch cholesteric liquid crystal may be used as a transparent mode of an active reflector (130 in FIG. 1). However, a cell pitch $p_0$ need not be long in order to provide high transmittance with respect to a visible region in a planar phase. The cell pitch $p_0$ may be remarkably reduced such that a selectively reflected wavelength in the planar phase is adjusted to be disposed within the infrared region. Even under this setting, high transmittance may still be maintained in the visible region in the planar phase of the cholesteric liquid crystal.

Figure 7:
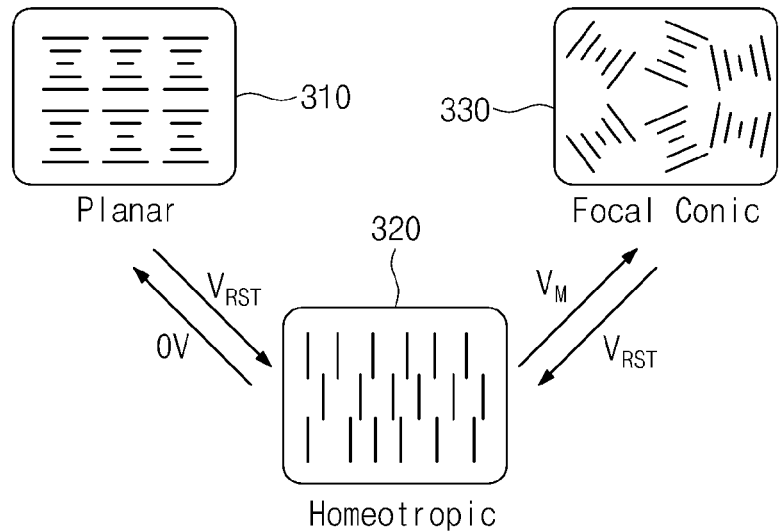
FIG. 7 is a state diagram illustrating phase transition of the cholesteric liquid crystal according to an exemplary embodiment of the present invention.

FIG. 7 is a state diagram illustrating a phase transition method of a long-pitch cholesteric liquid crystal according to an exemplary embodiment of the present invention. Referring to FIG. 7, the cholesteric liquid crystal includes a planar phase 310, a homeotropic phase 320, and a focal conic phase 330. The cholesteric liquid crystal can perform phase transition between the phases according to an applied voltage.

The planar phase 310 is used as a transparent mode of a transparent display device (100 in FIG. 1) according to exemplary embodiments of the present invention. The planar phase 310 is oriented such that helical axes of liquid crystal cells are all perpendicular to a transparent electrode plate. In case of a long-pitch cholesteric liquid crystal, the planar phase 310 is used to a transparent mode for transmitting visible light. When a strong electric field is applied to a cholesteric liquid crystal having the planar phase 310, phase transition occurs. A reset voltage $V_{RST}$, which is a high voltage, may be supplied to a transparent electrode to apply the strong electric field to the cholesteric liquid crystal. When the high voltage is applied to the transparent electrode, a phase of the cholesteric liquid crystal transitions from the planar phase 310 to the homeotropic phase 320.

The homeotropic phase 320 is a phase where axes of liquid crystal molecules are arranged parallel to an electric field. A strong, continuous electric field may be applied to constantly maintain the orientation of axes of polarized liquid crystal molecules. Thus, if the electric field disappears, the phase of the cholesteric liquid crystal transitions from the homeotropic phase 320 to the planar phase 310. On the other hand, a middle voltage $V_M$ relatively lower than the reset voltage $V_{RST}$ is supplied to change the phase of the cholesteric liquid crystal from the homeotropic phase 320 to the focal conic phase 330.

The focal conic phase 330 corresponds to a reflective mode of the transparent display device 100 according to the present invention. The focal conic phase 330 is a phase where a helical axis of a liquid crystal cell is relatively randomly oriented with respect to the transparent electrode plate. However, the phase of the cholesteric liquid crystal transitions to the homeotropic phase 320 when the reset voltage $V_{RST}$ is applied in the focal conic phase 330.

Display mode conversion between a transparent mode and a reflective mode may be accomplished through phase transition between the planar phase 310 and the focal conic phase 330 of the cholesteric liquid crystal. It is not easy to perform direct phase transition between the planar phase 310 and the focal conic phase 330. Thus, the phase transition between the planar phase 310 and the focal conic phase 330 is performed via the homeotropic phase 320. After the reset voltage $V_{RST}$ is applied to transparent electrodes disposed at both ends of the cholesteric liquid crystal, the middle voltage $V_M$ is applied to perform the phase transition from the planar phase 310 to the focal conic phase 330.

On the other hand, after the reset voltage $V_{RST}$ is applied to the transparent electrodes disposed at both ends of the cholesteric liquid crystal, a voltage of 0 volt is applied to perform the phase transition from the focal conic phase 330 to the planar phase 310. That is, phase transition from the focal conic phase 330 to the planar phase 310 occurs when a voltage applied to the transparent electrode is removed after the reset voltage $V_{RST}$ is applied.

Figure 8A:
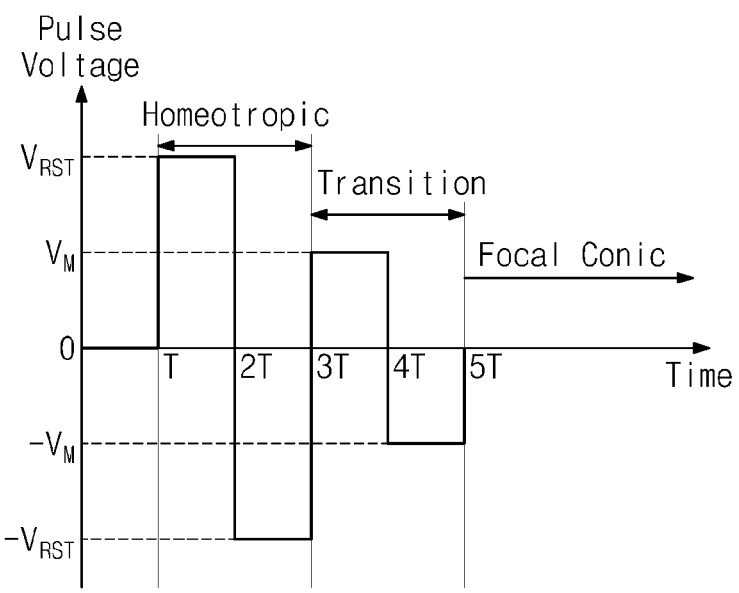
FIG. 8A and FIG. 8B are waveform diagrams of a driving voltage of a cholesteric liquid crystal according to an exemplary embodiment of the present invention.
Figure 8B:
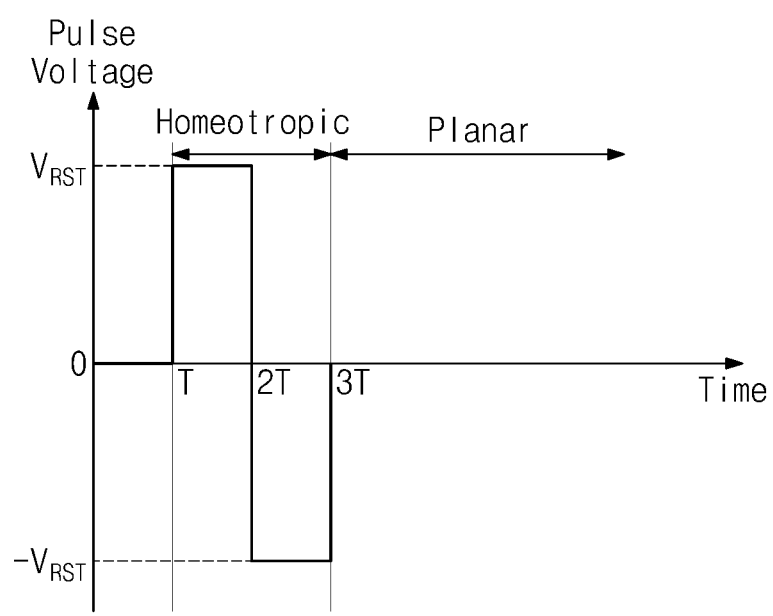

FIGS. 8A and 8B are waveform diagrams of a driving voltage of a cholesteric liquid crystal according to an exemplary embodiment of the present invention. More specifically, FIG. 8A shows a waveform of a voltage pulse for changing a phase of a cholesteric liquid crystal from a planar phase to a focal conic phase.

Referring to FIG. 8A, a bipolar pulse may be applied to both ends of a transparent electrode. First, a bipolar reset voltage ($V_{RST}$) pulse having a pulse width T is applied to both ends of the transparent electrode. That is, a positive reset voltage ($V_{RST}$) pulse is applied for a period T~2T. And then, a negative reset voltage (−$V_{RST}$) pulse is applied to the transparent electrode for a period 2T~3T. The cholesteric liquid crystal may be maintained at the homeotropic phase while the bipolar reset voltage ($V_{RST}$ and −$V_{RST}$) pulses are applied.

For a period 3T~5T, middle voltage ($V_M$ and −$V_M$) pulses are applied to the transparent electrode. The arrangement of the cholesteric liquid crystal transitions to the focal conic phase due to the electric fields established by the middle voltage ($V_M$ and −$V_M$) pulses. The phase of the cholesteric liquid crystal is maintained at the focal conic phase even if a voltage pulse is not applied after the middle voltage ($V_M$ and −$V_M$) pulses are each applied once.

Although it has been described that bipolar pulses ±$V_{RST}$ and ±$V_M$ are each applied once, the other pulse schemes may be applied. For example, the bipolar pulses ±$V_{RST}$ and ±$V_M$ may be set to be applied twice or more. In the order of applying bipolar pulses, it has been described that a positive voltage (+$V_{RST}$ or +$V_M$) pulse is applied ahead of a negative voltage (−$V_{RST}$ or −$V_M$) pulse, but it may be vice versa. Additionally, although it has been described that bipolar pulses are applied, the technical means of the present invention may be implemented through a unipolar pulse. Moreover, a pulse period T or a pulse level may be variously changed.

Referring to FIG. 8B, a pulse supplied for phase transition from a focal conic phase to a planar phase is exemplarily shown. It is assumed that a cholesteric liquid crystal is maintained at the focal conic phase before a point of time T. Positive reset voltage ($V_{RST}$) pulses of pulse width T are sequentially applied to both ends of a transparent electrode. That is, a positive reset voltage ($V_{RST}$) voltage is applied for a period T~2T. And then, a negative reset voltage (−$V_{RST}$) pulse is applied to the transparent electrode for a period 2T~3T. The cholesteric liquid crystal may be maintained at a homeotropic phase while the bipolar reset voltage ($V_{RST}$ and −$V_{RST}$) pulses are applied.

For phase transition to the planar phase, an electric field is removed after the phase of the cholesteric liquid crystal transitions to the homeotropic phase. Therefore, in the cholesteric liquid crystal according to an exemplary embodiment of the present invention, continuously applying a voltage to a transparent electrode is not needed for maintaining a transparent mode. The cholesteric liquid crystal may be maintained at the planar phase even after a point of time T3 when applying a voltage is completed.

Although it has been described that bipolar pulses ±$V_{RST}$ are each applied once, the present invention is not limited thereto. If necessary, the bipolar pulses ±$V_{RST}$ may be applied twice or more. In the order of applying bipolar pulses, it has been described that a positive voltage (+$V_{RST}$) pulse is applied ahead of a negative voltage (−$V_{RST}$) pulse, but it may be vice versa. Additionally, although it has been described that bipolar pulses are applied, the technical means of the present invention may be implemented through a unipolar pulse. Moreover, a pulse period T or a pulse level may be variously changed.

Figure 9:
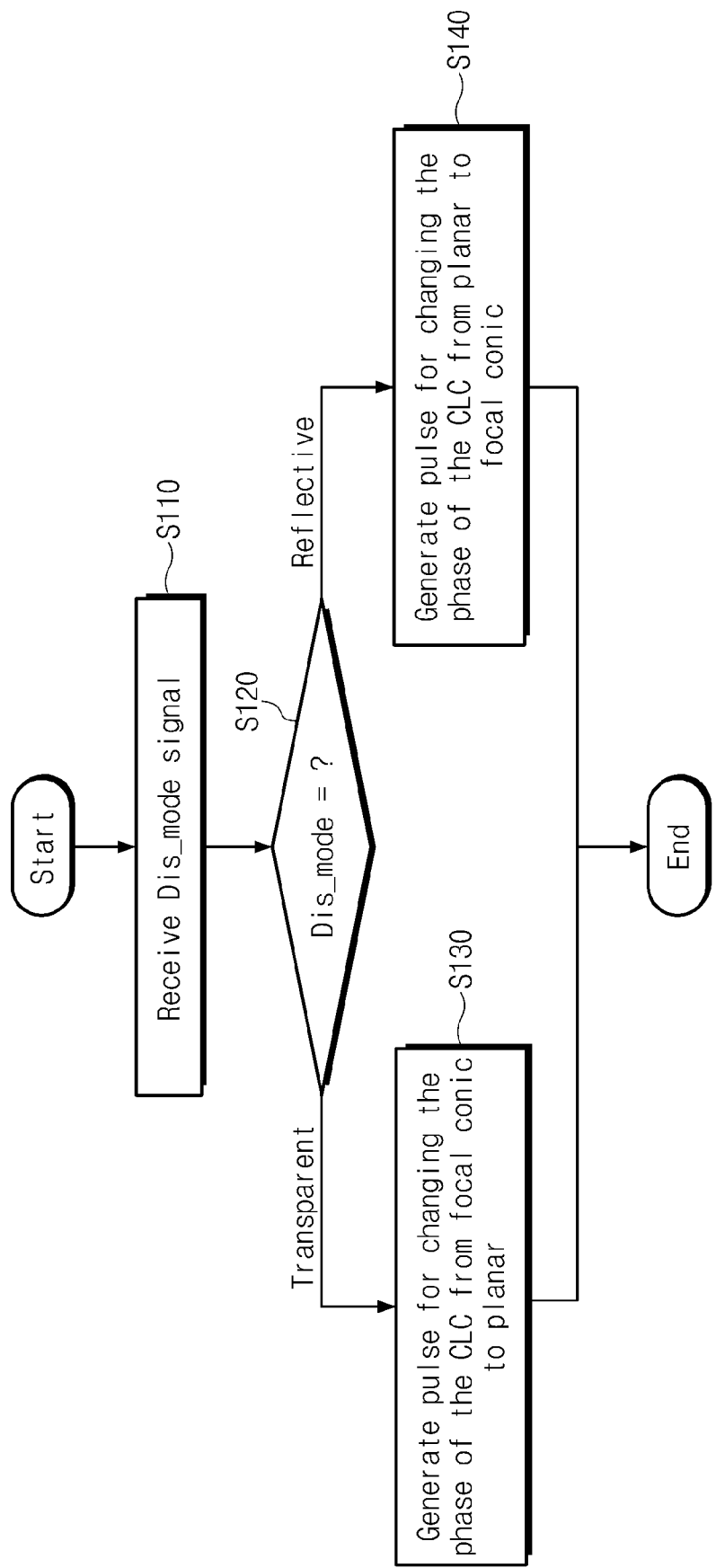
FIG. 9 is a flowchart illustrating a method for driving an active reflector according to an exemplary embodiment of the present invention.

FIG. 9 is a flowchart illustrating a method for driving an active reflector according to an exemplary embodiment of the present invention. Referring to FIG. 9, a reflector driver (140 in FIG. 1) controls an active reflector (130 in FIG. 1) according to a display mode. This will be described below in detail.

At S110, the reflector driver 140 receives a display mode Dis_mode. The display mode Dis_mode may be received from an upper controller (not shown) for controlling a transparent display device 100.

At S120, an operation branch occurs according to the received display mode Dis_mode. When the display mode Dis_mode is a transparent mode, the flow proceeds to S130. On the other hand, when the display mode Dis_mode is a reflective mode, the flow proceeds to S140.

At S130, the reflector driver 140 generates a pulse for changing a phase of a cholesteric liquid crystal (CLC) from a focal conic phase to a planar phase. For example, a reset voltage ($V_{RST}$) pulse of the shape shown in FIG. 8B may be generated. The generated pulse may be applied to transparent electrodes disposed at both sides of the cholesteric liquid crystal.

At S140, the reflector driver 140 generates a pulse for changing the phase of the cholesteric liquid crystal CLC from the planar phase to the focal conic phase. For example, high-voltage bipolar pulses ±$V_{RST}$ of the shape shown in FIG. 8A and subsequent middle-voltage pulses ±$V_M$ may be generated. In some cases, the bipolar pulses ±$V_{RST}$ and ±$V_M$ may be generated twice or more. The generated pulse may be applied to the transparent electrodes disposed at both sides of the cholesteric liquid crystal. Although FIG. 9 shows the case where the display mode signal Dis_mode is received only when the display mode is to be changed, other variations are possible. For example, the display mode signal Dis_mode may be constantly received, and the display mode may switch from transparent to reflective only when the display mode signal Dis_mode indicates the switch.

Figure 10A:
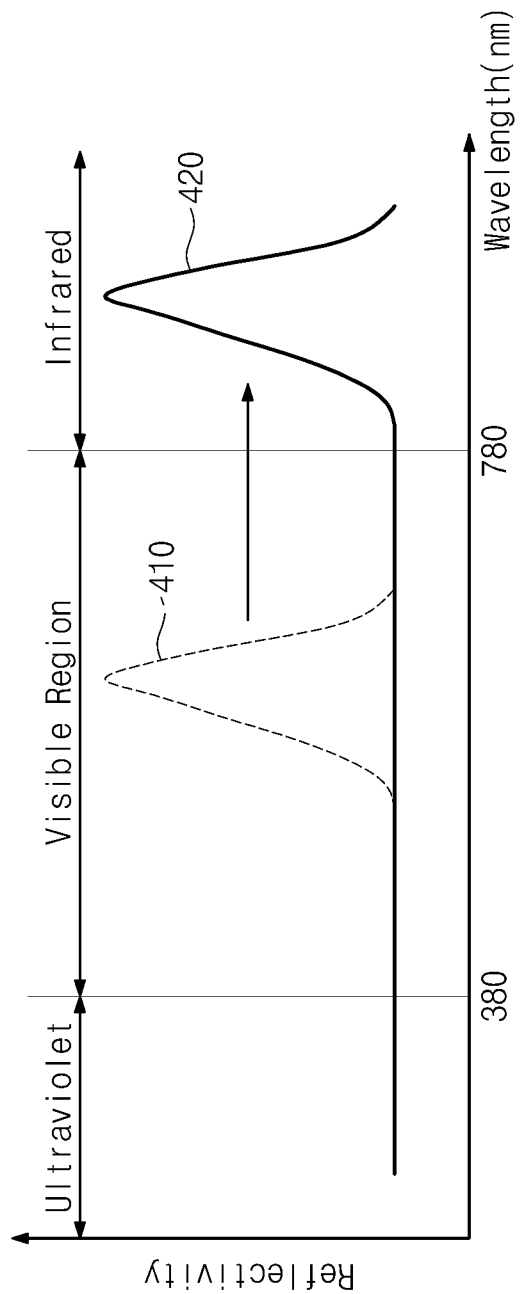
FIG. 10A and FIG. 10B are graphic diagrams illustrating reflectivities of a cholesteric liquid crystal according to an exemplary embodiment of the present invention.
Figure 10B:
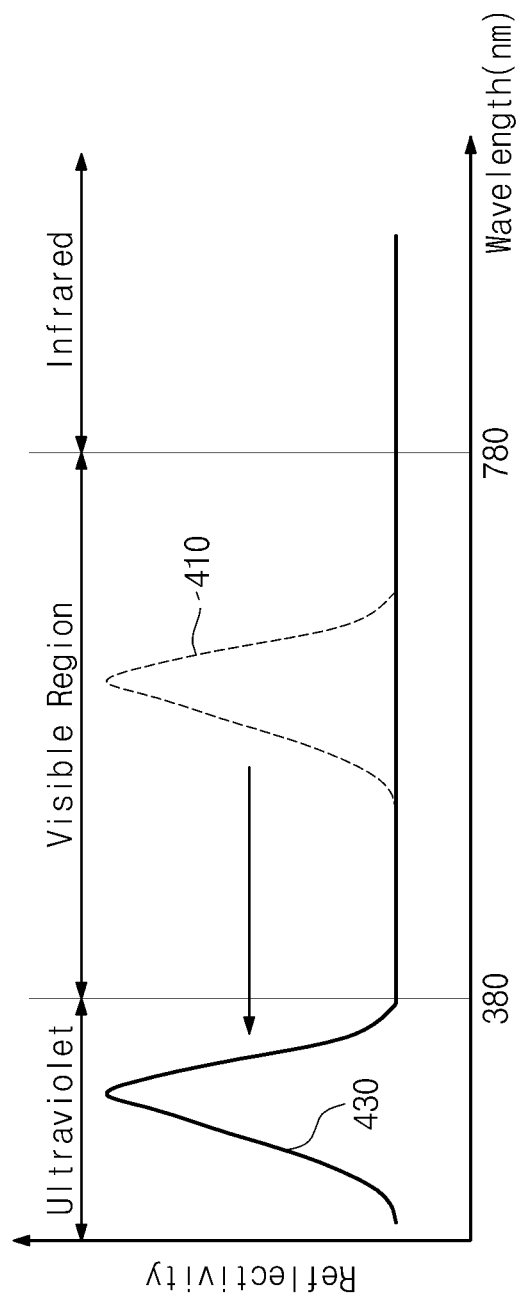

FIGS. 10A and 10B are graphic diagrams illustrating reflection characteristics in a planar phase of a pitch-adjusted cholesteric liquid crystal according to an exemplary embodiment of the present invention. More specifically, FIG. 10A illustrates reflection characteristics for a wavelength of incident light of a long-pitch cholesteric liquid crystal, and FIG. 10B illustrates reflection characteristics of a wavelength of incident light of a short-pitch cholesteric liquid crystal. The long-pitch liquid crystal includes a liquid crystal cell whose pitch $p_0$ is greater than 500 nm, and the short-pitch liquid crystal includes a liquid crystal cell whose pitch $p_0$ is less than 250 nm.

Referring to FIG. 10A, a cholesteric liquid crystal generally has the shape of a curve 410 in the case where a planar phase is used as a reflective mode. That is, the cholesteric liquid crystal exhibits the maximum reflectivity in a visible region when using the planar phase as a reflective mode. However, if a long-pitch cholesteric liquid crystal is formed by adjusting a cell pitch, the maximum reflectivity in the planar phase is exhibited in an infrared region. This characteristic is shown by the curve 420. That is, it will be understood that the transmission characteristics of visible light are sufficiently improved in the planar phase of the long-pitch cholesteric liquid crystal to use the planar phase as the transparent mode.

FIG. 10B shows the case where a cell pitch of a cholesteric liquid crystal is reduced. It will be understood that transmission characteristics in the visible region are improved in a planar phase of the short-pitch cholesteric liquid crystal. The cholesteric liquid crystal generally has the shape of the curve 410 in the case where the planar phase is used as the reflective mode. That is, the maximum reflectivity is exhibited in the visible region when using the planar phase as the reflective mode. However, if a short-pitch cholesteric liquid crystal is formed by reducing a cell pitch, the maximum reflectivity in the planar phase is exhibited in an ultraviolet region. This characteristic is shown by a curve 430. That is, it will be understood that the transmission characteristics of visible light are sufficiently improved in the planar mode of the short-pitch cholesteric liquid crystal to use the planar phase as the transparent mode.

As described with reference to FIGS. 10A and 10B, it will be understood that light transmission/reflection characteristics may be controlled by adjusting a pitch of a liquid crystal cell.

According to the present invention as described above, since a transparent mode and a reflective mode are implemented in a bistable mode of a liquid crystal, high power efficiency can be provided. Moreover, since superior transmission characteristics for a visible region may be provided by adjusting pitches of liquid crystal cells, a high-definition transparent display device can be implemented.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A transparent display device comprising:
 a light guide plate configured to transmit an incident light and a reflected light; and
 an active reflector disposed on a surface of the light guide plate and comprising a cholesteric liquid crystal layer configured to transmit the incident light while in a planar phase in a transparent mode.

2. The display device of claim 1, wherein the active reflector is configured to provide the reflected light to the light guide plate while in a reflective mode with the cholesteric liquid crystal layer being in a focal conic phase.

3. The display device of claim 1, wherein the active reflector further comprises a first transparent electrode plate and a second transparent electrode plate, the cholesteric liquid crystal being disposed between the first and second transparent electrode plates.

4. The display device of claim 3, further comprising:
 a reflector driver configured to provide a phase change pulse to the first transparent electrode plate and the second transparent electrode plate, the phase change pulse configured to produce phase transition of the cholesteric liquid crystal layer.

5. The display device of claim 4, wherein the reflector driver is configured to provide, to the first and second transparent electrode plates, a first phase change pulse to change a phase of the cholesteric liquid crystal layer from a focal conic phase to the planar phase.

6. The display device of claim 5, wherein the first phase change pulse comprises:
 a reset pulse to change the phase of the cholesteric liquid crystal layer to a homeotropic phase during a reset pulse period; and
 a ground voltage period subsequent to the reset pulse period.

7. The display device of claim 6, wherein bipolar reset voltages are sequentially generated during the reset pulse period.

8. The display device of claim 4, wherein the reflector driver is configured to provide, to the first and second transparent electrode plates, a second phase change pulse to change the phase of the cholesteric liquid crystal layer from the planar phase to the focal conic phase.

9. The display device of claim 8, wherein the second phase change pulse comprises:
 a reset pulse to change the phase of the cholesteric liquid crystal layer to a homeotropic phase during a reset pulse period;
 a middle voltage pulse having a lower magnitude than the reset voltage to change the phase of the cholesteric liquid crystal layer from a homeotropic phase to a focal conic phase during a middle voltage pulse period; and
 a ground voltage period subsequent to the middle voltage pulse period.

10. The display device of claim 1, wherein liquid crystal cells of the cholesteric liquid crystal layer each have a cell pitch less than 250 nm or greater than 500 nm.

11. The display device of claim 1, further comprising:
 a liquid crystal display panel disposed on the front surface of the light guide plate.

12. The display device of claim 1, further comprising:
 a light source configured to provide light to the active reflector via a side surface of the light guide plate.

13. A method for driving a transparent display device using a cholesteric liquid crystal layer as an active reflector, the driving method comprising:
 detecting a display mode; and
 providing, to the active reflector, a pulse for changing a phase of the cholesteric liquid crystal layer to one of a focal conic phase and a planar phase according to the display mode,
 wherein the cholesteric liquid crystal layer operates in a transparent mode in the planar phase.

14. The method of claim 13, wherein a cell pitch of the cholesteric liquid crystal layer is less than 250 nm or greater than 500 nm.

15. The method of claim 13, wherein the pulse comprises a bipolar pulse.

16. The method of claim 13, wherein the cholesteric liquid crystal layer operates in a transparent mode in the planar phase, and the planar phase is generated in response to a voltage pulse and maintained without continuing application of a voltage after the voltage pulse ends.

\* \* \* \* \*